United States Patent
Everett et al.

(10) Patent No.: US 6,526,475 B1
(45) Date of Patent: Feb. 25, 2003

(54) FLEXIBLE MANAGEMENT OF MULTIPLE FILE SYSTEMS

(75) Inventors: Timothy J. Everett, Thakeham (GB); Ronald M Tol, Eindhoven (NL); Pieter B. Ijdens, Eindhoven (NL)

(73) Assignee: Koninklijke Phillips Electronic N.V., Eindhoven (NL)

( * ) Notice: Subject to any disclaimer, the term of this patent is extended or adjusted under 35 U.S.C. 154(b) by 0 days.

(21) Appl. No.: 09/333,630

(22) Filed: Jun. 15, 1999

(30) Foreign Application Priority Data

Jun. 27, 1998 (GB) .............................................. 9813830

(51) Int. Cl.⁷ ............................................. G06F 12/00
(52) U.S. Cl. ..................... 711/111; 711/173; 711/221
(58) Field of Search ............................. 711/4, 111, 202, 711/173, 221

(56) References Cited

U.S. PATENT DOCUMENTS 5,426,747 A  *  6/1995  Weinreb et al.
5,734,787 A     3/1998  Yonemitsu et al. ......... 386/111

FOREIGN PATENT DOCUMENTS

EP    0896335 A2   2/1999  ........... G11B/27/32

* cited by examiner

Primary Examiner—Jack A. Lane
(74) Attorney, Agent, or Firm—Michael E. Belk

(57) ABSTRACT

A file management system is provided which enables the peaceful coexistence of two or more file systems from different applications (12,16) on the same medium (10). Available free space can be assigned to each of the file systems. Static partitioning of the medium in fixed sized parts is not necessary, as partition sizes can be dynamically changed.

11 Claims, 2 Drawing Sheets

FLEXIBLE MANAGEMENT OF MULTIPLE FILE SYSTEMS

BACKGROUND OF THE INVENTION

1. Technical Field

The present invention relates to methods and apparatus for data storage and retrieval particularly, but not essentially, in conjunction with optical disc storage devices.

2. Related Art

Recent years have seen a great expansion in the complexity of consumer electronics equipment with several different proprietary and technical standards governing interconnectivity and data storage. In connection with the latter feature, the domestic user has had to put up with using different mechanical and functional configurations of storage device for different types of equipment, such as a VHS cassette for video recording, an audio compact cassette for audio recordings from Hi-Fi equipment, and floppy discs for data storage on personal computers. With the advent of recordable optical discs conforming to unified standards as far as data layout, bit rates etc. are concerned, such discs may (if configured to the particular recording system) replace many of the disparate options, and hence the possibility of a single unified standard, both in terms of physical configuration and data management, may be contemplated for all types of domestic audio/video/data-processing systems. Whilst each specific application will have its own particular requirements, the physical record carriers to be used (whether optical discs or some other device) should increasingly be capable of use with more than just a single system or medium.

It is therefore an object of the present invention to provide a scheme for data storage on a medium readable by devices of different functionalities, with not only effective partitioning of files between applications, but also inherent interconnectivity such as to permit, at least in a limited fashion, handling of files from one application by apparatus effecting a different application.

SUMMARY OF THE INVENTION

In accordance with the present invention there is provided a storage device containing a memory space to be accessed by a first read/write apparatus, the memory space being partitioned into an array of fragments, at least some of which are read/write accessible by the first apparatus, and containing a contents table for the fragments stored at a predetermined location within the memory space, said table being updateable by said first apparatus; characterised in that at least some fragments are read/write accessible by a second apparatus, to the exclusion of the first apparatus, and the contents table is arranged to indicate for each fragment whether it carries data from the first or the second apparatus or whether it is free and available for use by either. By holding indication in the contents table of the using device/apparatus for each fragment, two file systems may peacefully co-exist in a single storage device, such that unused storage space from one application is not wasted, but instead may be made available to another device which, though physically compatible with the storage device, functions in a different manner to that device initially utilising the storage.

The storage device may be in the form of an optical disc, and data written to fragments (which fragments are suitably of a common size) by the first apparatus may comprise digitised audio and/or video material with the contents table entries in respect of those fragments comprising playlists for the material. The above-mentioned second apparatus may be a data processing apparatus (such as a personal computer) for which the contents table may comprise a logical volume descriptor for those fragments available to the second apparatus.

In use, one of the above-mentioned first and second apparatuses is suitably assigned precedence such that it may overwrite fragments in the storage device already used by the other. The contents table may include identifiers for fragments used by the first apparatus in a format supported by the second apparatus, whereby the second apparatus is enabled to identify fragment usage of the first apparatus.

The present invention also provides a method for formatting memory space in a storage medium to be accessed by a first read/write apparatus comprising the steps of: partitioning the medium into an array of fragments at least some of which are read/write accessible by the first apparatus; and generating a contents table for the fragments and storing the same at a predetermined location within the memory space, said table being updateable by said first apparatus; characterised in that at least some fragments are read/write accessible by a second apparatus, to the exclusion of the first apparatus, and the contents table is arranged to indicate for each fragment whether it carries data from the first or the second apparatus or whether it is free and available for use by either.

Further in accordance with the present invention there is provided a data processing apparatus operable to implement the foregoing method, said apparatus comprising means arranged to receive and format the memory space in said storage medium to be subsequently accessed by said data processing apparatus, the formatting means being configured to partition the medium into an array of fragments at least some of which are read/write accessible by the first apparatus, and to generate a contents table for the fragments, store the same at a predetermined location within the memory space, and periodically update the same; characterised in that the apparatus is further arranged to assign at least some of the fragments as read/write accessible by a second apparatus, and to place in the contents table an indication for each fragment whether it carries data from the data processing apparatus or the second apparatus or whether it is free and available for use by either.

BRIEF DESCRIPTION OF THE DRAWINGS

Preferred embodiments will now be described by way of example only, and with reference to the accompanying drawings in which.

DETAILED DESCRIPTION OF THE INVENTION

Figure 1:
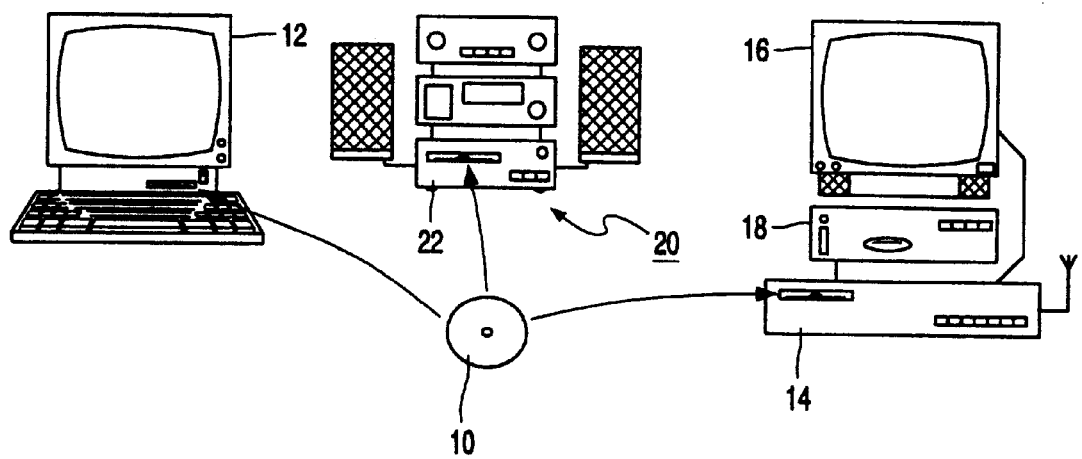
FIG. 1 symbolically represents the application of a record carrier embodying the present invention to different types of AV and data processing apparatus.

As mentioned above, there is approaching convergence in terms of data storage media for different domestic applications. FIG. 1 illustrates schematically the scenario of a user who wishes to use a single record carrier device (in this and the subsequent description a writable and optically-read disc) 10. As shown, the user may have available to them different systems including a personal computer (PC) 12, video disc recorder 14 (coupled with television 16 and digital broadcast set-top box or satellite decoder 18), and Hi-Fi system 20 (including a record/playback component 22 for digital audio). In order that the user does not have to use separately formatted (although physically matching) discs for each type of apparatus, a common format has often been sought. Due to the differing requirements of each use, commonality is still a problem: what is sought here is compatibility, such that a user may use a single record carrier 10 in more than one application, for example to record a film from the television, as well as data files from the PC, with each application respecting (i.e. not overwriting or corrupting) the information stored by a different device.

In the following, a file system for a recordable optical video disc is described, which disc is compatible with both consumer electronics (CE) devices and personal computers (PC) The requirements for such a disc system may be summarised as follows:

1. Support for AV (or real-time) files, which are visible to the user as play lists, including support for multiple logical streams which can reference the same AV data, and trick play.
2. Support for (PC) data files.
3. Compatibility with multiple platforms.

In providing the video disc compatible with both CE and PC applications, certain attributes and functionalities are of specific value to systems biased toward use in one host system in preference to the other. For a CE-biased arrangement, the first disc fragment would be used for the file system data, with other fragments used for AV data. Rather than an arbitrary disc layout (as for PC file systems) a fixed part of the disc would hold a skeleton standard file to reference the data part of the disc. Disc updates would be kept as simple as possible, playlists would be supported, and non-AV data may be supported.

For the PC-biased solution, compatibility results from using a predetermined or standardised file format, one example of which is the Universal Disk Format (UDF). UDF is a specification developed by the Optical Storage Technology Association for use in optical storage devices: the specification derives from International standard ISO 13346. In the following example, compliance with UDF is assumed, although it will be recognised that the present invention is not restricted to, nor constrained by, conformance with this standard.

Using UDF data structures and using a logical linear address space enables PC files to be read and written on any PC supporting UDF. A special directory structure would be defined for the consumer video disc with support for play lists and other special AV data and fast access to real-time files. Fragments would be aligned on boundaries to avoid fragmentation, file system data structures would be cached to avoid extra disc accesses during real-time operation, and means would be provided for recovery of unwritten caches in case of disaster.

Each of the two 'biased' solutions above has particular benefits for its intended target but these detract from the general interchangeability we seek.

Figure 2:
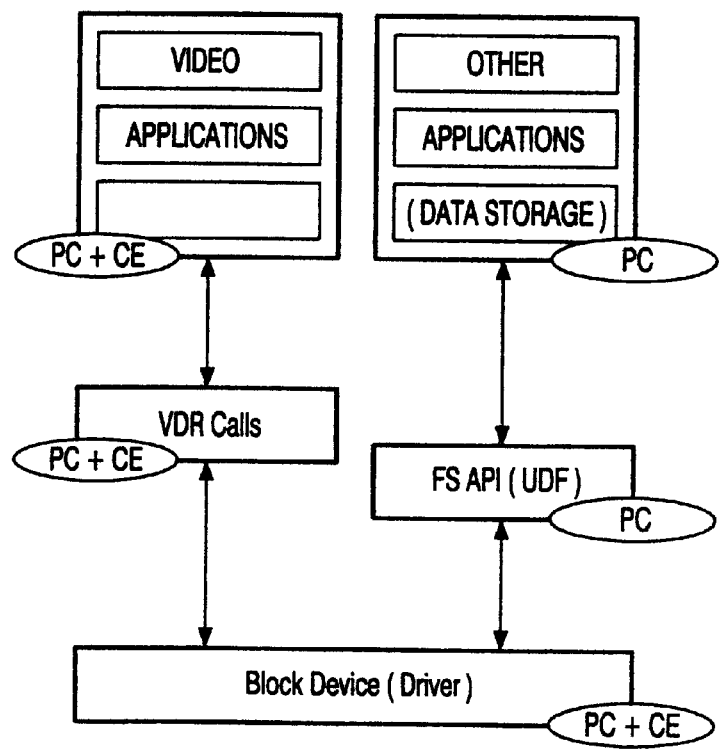
FIG. 2 illustrates differing control layers as applicable when the record carrier of FIG. 1 is accessed by different configurations of reading apparatus.

When a video disc is put in a PC it is possible to obtain some free space to implement a UDF logical volume for PC data use. This space is marked unusable for the video disc application. For this, two interfaces are provided to the block device: one via calls to a video disc API, which is available on the CE device as well as on the PC, and another via an UDF logical volume, whose contents can only be accessed if a full-fledged UDF file system implementation is present, as schematically illustrated in FIG. 2.

Figure 3:
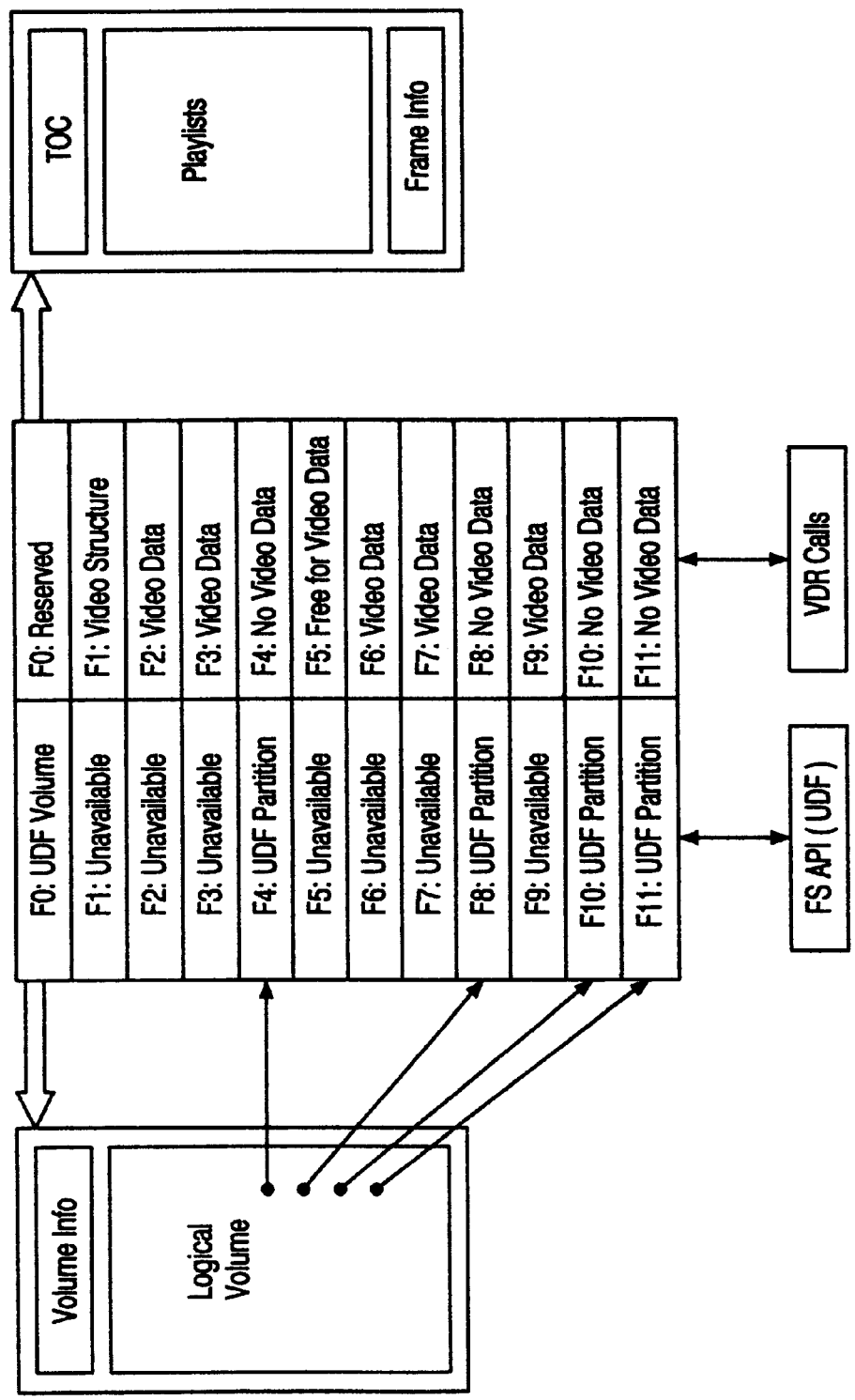
FIG. 3 illustrates variation in the file management and availability in the stored data on the record carrier of FIG. 1 depending on the functionality of the reading device.

The video disc application, running on the PC or the CE device, would have a view on the data of the disc, as shown by the right-hand half of FIG. 3. If, for some reason, there is not enough space on the disc, a user may decide to delete fragments that contain data not related to the video disc application. If the user wants to be selective about what to delete, a UDF implementation needs to be present on the device. The PC using its UDF entrance to the data will have the view shown by the left-hand side of FIG. 3, whilst a device supporting both the video disc API and UDF has the possibility to access both types of data (FIG. 3 as a whole).

For full compatibility, the stored AV files are preferably readable and writeable on a PC: by implementing simple editing facilities on a CE device and leaving advanced editing to the PC, this may be implemented via the video disc. With AV and PC data files residing on the same disc, there are two possibilities for manipulating (PC) data files on the CE device, the first of which is the all-or-nothing approach, i.e., it should be possible for a user to delete all non-AV files to make room for a recording. The second possibility introduces selectivity where it is possible for a user to delete specific (PC) data files.

Considering what happens if a user puts a virgin disc in a CE device and, later on, decides to use it in a PC as well, as well as the other way round; namely the user puts a virgin disc in a PC and subsequently decides to use it in a CE device. In the former case, there are two options: either a first area ('fragment O') is deliberately ignored by the CE device to subsequently allow the PC to simply add the UDF file system, or repartition of the disc is implemented and a UDF part is created on it. In the latter case, either it is necessary for the CE device to offer reformatting of the disc to the user, or the PC is enabled to repartition the disc and create a VDR file system on the PC, in other words the PC makes the disc suitable for CE applications.

In terms of complexity, there is a trade-off between complexity of the solutions and required compatibility as discussed above. A full-fledged UDF implementation plus a video disc API on top is more complex than implementing a video disc API on a block device, but a consideration of possible objections to UDF shows that, on balance, its selection is generally justified.

From reading the present disclosure, other variations will be apparent to persons skilled in the art. Such variations may involve other features which are already known in the methods and apparatuses for data management and storage and component parts thereof and which may be used instead of or in addition to features already described herein. Although claims have been formulated in this application to particular combination of features, it should be understood that the scope of the disclosure of the present application also includes any novel feature or any novel combination of features disclosed herein either implicitly or explicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or any further application derived therefrom.

What is claimed is:

1. A storage device containing a memory space to be accessed by a first read/write apparatus, the memory space being partitioned into an array of fragments, at least one of which is accessible by the first apparatus, and containing a contents table for the fragments stored at a predetermined location within the memory space, said table being updateable by said first apparatus;

characterised in that at least one fragment is read/write accessible by a second apparatus, to the exclusion of the first apparatus, and the contents table is arranged to indicate for each fragment whether the fragment carries data from the first or the second apparatus and whether the fragment is free and available for use by either.

2. The storage device of claim 1, wherein the storage device includes an optical disc, wherein the data written to the fragments by the first apparatus is selected from the group consisting of digitised audio material, digitized video material, and combinations thereof, and wherein the contents table entries for the fragments comprise playlists for the material.

3. The storage device of claim 2, wherein the disc fragments are of a common size.

4. The storage device of claim 1, wherein the storage device includes an optical disc, wherein the second apparatus is a data processing apparatus, and wherein the contents table comprises a logical volume descriptor for the fragments accessible to the second apparatus.

5. The storage device of claim 4, wherein the disc fragments are of a common size.

6. The storage device of claim 1, wherein when one of the first and second apparatuses is assigned precedence, the apparatus assigned precedence overwrites fragments used by the other apparatus.

7. The storage device of claim 1, wherein the contents table includes identifiers for fragments used by the first apparatus in a format supported by the second apparatus, whereby the second apparatus is enabled to identify a fragment usage of the first apparatus.

8. A method for formatting memory space in a storage medium to be accessed by a first read/write apparatus comprising the steps of:

partitioning the medium into an array of fragments at least one of which is read/write accessible by the first apparatus; and generating a contents table for the fragments and storing the same at a predetermined location within the memory space, said table being updateable by said first apparatus;

characterised in that at least one fragment is read/write accessible by a second apparatus, to the exclusion of the first apparatus, and the contents table is arranged to indicate for each fragment whether the fragment carries data from the first or the second apparatus and whether the fragment is free and available for use by either.

9. The method of claim 8, further comprising the step of assigning precedence to one of the first apparatus and the second apparatus, enabling the apparatus having precedence to overwrite at least one fragment used by the other apparatus.

10. The method of claim 8, further comprising including in the contents table identifiers for fragments used by the first apparatus in a format supported by the second apparatus, whereby the second apparatus is enabled to identify the fragment usage of the first apparatus.

11. A data processing apparatus, for formatting memory space in a storage medium to be accessed by a first read/write apparatus, comprising:

means arranged to receive and format the memory space in said storage medium to be subsequently accessed by said data processing apparatus, wherein the formatting means is configured to partition the medium into an array of fragments at least one of which is read/write accessible by the first apparatus, and to generate a contents table for the fragments, store the fragments at a predetermined location within the memory space, and periodically update the fragments;

characterised in that the data processing apparatus is further arranged to assign at least one of the fragments as read/write accessible by a second apparatus, and to place in the contents table an indication for each fragment whether the fragment carries data from the data processing apparatus or the second apparatus and whether the fragment is free and available for use by either.

* * * * *

UNITED STATES PATENT AND TRADEMARK OFFICE
CERTIFICATE OF CORRECTION

PATENT NO.    : 6,526,475 B1
DATED         : February 25, 2003
INVENTOR(S)   : Timothy J. Everett et al.

It is certified that error appears in the above-identified patent and that said Letters Patent is hereby corrected as shown below:

<u>Title page,</u>
Item [73], Assignee, change "Phillips" to -- Philips --.

Signed and Sealed this

Ninth Day of September, 2003

JAMES E. ROGAN
*Director of the United States Patent and Trademark Office*